United States Patent [19]
Kodali et al.

[11] Patent Number: 5,885,643
[45] Date of Patent: Mar. 23, 1999

[54] HIGH STABILITY CANOLA OILS

[75] Inventors: Dharma R. Kodali, Plymouth, Minn.; Lorin R. DeBonte; Zhegong Fan, both of Fort Collins, Colo.

[73] Assignee: Cargill, Incorporated, Wayzata, Minn.

[21] Appl. No.: 651,684

[22] Filed: May 21, 1996

[51] Int. Cl.[6] .................................................. A23D 9/00
[52] U.S. Cl. ........................ 426/601; 426/606; 426/607; 554/9; 554/124; 554/141
[58] Field of Search ................................ 426/606, 607, 426/601; 554/9, 124, 141, 144, 145

[56] References Cited

U.S. PATENT DOCUMENTS

| | | | |
|---|---|---|---|
| 4,748,041 | 5/1988 | Player et al. . | |
| 4,948,811 | 8/1990 | Spinner et al. . | |
| 5,393,906 | 2/1995 | Price et al. . | |
| 5,668,299 | 9/1997 | Debonte | 800/230 |
| 5,750,827 | 5/1998 | Debonte | 800/200 |
| 5,767,338 | 6/1998 | Fan | 800/200 |

FOREIGN PATENT DOCUMENTS

| | | |
|---|---|---|
| 0 323 753 A1 | 7/1989 | WIPO . |
| WO 90/10380 | 9/1990 | WIPO . |
| WO 92/03919 | 3/1992 | WIPO . |
| WO 93/06714 | 4/1993 | WIPO . |
| WO 94/15478 | 7/1994 | WIPO . |
| WO 94/24849 | 11/1994 | WIPO . |
| WO 95/00035 | 1/1995 | WIPO . |
| WO 95/00036 | 1/1995 | WIPO . |

OTHER PUBLICATIONS

Bansal et al., J. of Food Science, 47, 1338–1344 (1982).
R. Carr, Food Technology, 45, 95–96 (1991).
Eskin et al., JAOCS, 66 No. 8, 1081–1084 (Aug. 1989).
D'Souza et al., "Polymorphic Behavior of High–Melting Glyerides from Hydrogenated Canola Oil," *JAOCS*, 68, No. 12, 907–911.
Köseoglu et al., "Recent Advances in Canola Oil Hydrogenations," *JAOCS*, 67 No. 1, 39–47 (Jan. 1990).
Fan et al., "Reactivity of Fatty Acids in the Different Positions of the Triglycerides during Hydrogenation of Canola Oil," *JAOCS*, 63 No. 7, 898–901 (Jul. 1986).
Hoffman, The Chemistry and Technology of Edible Oils and Fats and Their High Fat Products, 201–277, Academic Press, Meeuwenlaan 26, 3055 CM Rotterdam, The Netherlands.
Koseoglu et al., Canola and Rapeseed, Shahidi (Ed.), Chap. 8, 123–148, Van Nostrand Reinhold, NY, NY 1990.
Neff et al., Paper: "Oxidative Stabilities of Oils from Selected Canola Varieties", 84th American Oil Chemists' Society Annual Meeting, Anaheim, Calif., Apr. 24–29, 1993 (Abstract).
Pleines et al., Fat Sci. Technol., 90(5), 167–171 (1988).
Scarth et al., Can. J. Plant Sci., 68, 509–511 (1988).
Sze–Chung Wong et al., Advances in Applied Biotechnology Series vol. 12, Ed. Haberstroh and Morris, 153–164 (1991) Gulf Publishing Company.
Warner et al., JAOCS, 66, No. 4, 558–564 (Apr. 1989).
Database WPI, Week 7735, Derwent Publications Ltd., London, GB; AN 77–6187Y & JP,A,52 085 206 (Asahi Electrochem INID KK) 15 Jul. 1977.
Database WPI, Week 9249, Derwent Publications Ltd., London, GB; AN 92–399446 & CS,D,748 889 (Palma SP) 17 Jun. 1992.
Pricat Catalysts, Versatile Catalysts for Hydrogenation of Triglycerides and Fatty Acids, Hydrogenation of Canola Oil, Tech. Info. Bulletin, Mar. 1992.
A.O.C.S. Official Method Cd 12–57, pp. 1–4 (1989).

*Primary Examiner*—Carolyn Paden
*Attorney, Agent, or Firm*—Fish & Richardson, P.C., P.A.

[57] ABSTRACT

Hydrogenated canola oils having improved oxidative stability are disclosed. These oils have relatively low levels of trans-fatty acids and saturated fatty acids, yet possess an oxidative stability of greater than 300 AOM hours. Such oils can be produced by hydrogenation of refined, bleached canola oil extracted from Brassicaceae seeds having elevated levels of oleic acid and reduced levels of polyunsaturated fatty acids. Brassica lines producing seeds having such fatty acid profiles are disclosed. Hydrogenated oils may be fractionated to obtain canola oils that are liquid at or below room temperature and have relatively low levels of trans-fatty acids and saturated fatty acids, yet have an oxidative stability of greater than 300 AOM hours.

11 Claims, No Drawings

HIGH STABILITY CANOLA OILS

FIELD OF THE INVENTION

The present invention relates to hydrogenated canola oil having improved oxidative stability and performance attributes, and to Brassica seeds, plant lines and progeny thereof from which such an oil is derived.

BACKGROUND OF THE INVENTION

Canola oil has the lowest level of saturated fatty acids of all vegetable oils. As consumers become more aware of the health impact of lipid nutrition, consumption of canola oil in the U.S. has increased. However, canola oil extracted from many natural and commercial varieties of rapeseed contains a relatively high α-linolenic acid content ($C_{18:3}$; all cis 9,12,15 octadecatrienoic acid; ALA). The oil is unstable and easily oxidized during cooking, which in turn creates off-flavors and compromises the sensory characteristics of foods cooked in such oils. It also develops unacceptable off odors and rancid flavors during storage.

Hydrogenation can be used to improve performance attributes by lowering the amount of linoleic and α-linolenic acids in the oil. Hydrogenation converts cis mono- and cis poly-unsaturated fatty acids into trans-fatty acids and saturated fatty acids. Saturated and trans-fatty acids are not desirable for health reasons. It would be desirable to reduce the level of polyunsaturates in order to improve the oxidative stability and the shelf life of these oils while minimizing the increase in trans-fatty acids and saturated fatty acids.

Different vegetable oils can be blended to reduce the α-linolenic acid content and improve performance attributes. However, blending canola oil with other vegetable oils such as cottonseed oil increases the saturated fatty acid content of the final product and decreases the healthy attributes of canola oil.

α-Linolenic acid has been reported to have a relatively low oxidative stability. In general, the oxidative stability of oleic acid is about 10 fold greater than that of linoleic acid, and the oxidative stability of linoleic acid is about 2 fold greater than that of linolenic acid.

Linoleic and α-linolenic acids have been suggested as precursors to undesirable odor and flavor development in foods. To improve the functionality of canola oil, the University of Manitoba developed the canola variety "Stellar" which has reduced α-linolenic acid (Scarth et al., Can. J. Plant Sci., 68:509–511 (1988)). The low α-linolenic acid oil was reduced in odor when heated in air, but still remained unacceptable to the sensory panel in flavor evaluations (Eskin et al., J. Am. Oil Chem. Soc. 66:1081–1084 (1989)). The oxidative stability of Stellar oil increased by 17.5% over the commercial variety Westar as measured by Active Oxygen Method (AOM) hours. (Can. J. Plant Sci. (1988) Vol. 68, pp. 509–511).

European Patent Application, EP 0 323 753 A1 describes a canola oil having an enhanced oleic acid content and suggests that such an oil would have increased heat stability in combination with other traits. The application describes a canola oil with reduced α-linolenic acid. However, no flavor or performance testing was reported for any oil.

The factors affecting oxidative stability and flavor stability of canola oils are not completely understood, although it is known that the amount of α-linolenic acid in the oil affects oxidative stability and flavor stability. A canola oil is needed that possesses very high oxidative stability and improved flavor and odor characteristics.

SUMMARY OF THE INVENTION

Hydrogenated canola oils are disclosed herein. In one aspect of the invention, an oil has a Mettler Drop Point (MDP) of more than about 30° C., a trans-fatty acid content of about 31% or less, an IV of from about 68 to about 75 and a minimum AOM value of about 280 hours in the absence of added antioxidants. In some embodiments, this oil is produced from a starting oil extracted from Brassicaceae seeds that have a fatty acid profile comprising an oleic acid content of about 72% to about 80%, a linoleic acid content of about 5% to about 12% and an α-linolenic acid content of about 1% to about 5%. The fatty acid profile in such seeds may be controlled by heritable genetic change that is present in seeds designated as IMC-130 and deposited as ATCC accession number 75446.

The hydrogenated oil can be separated to obtain a liquid oil fraction that has an MDP of less than about 20° C., a trans-fatty acid content of about 31% or less, an IV of from about 72 to about 77 and a minimum AOM value of about 290 hours in the absence of added antioxidants. In some embodiments, the liquid oil fraction can have a minimum AOM value about 330 hours.

In another aspect of the invention, a hydrogenated canola oil has an MDP of more than about 30° C., a trans-fatty acid content of about 40% or less, an IV of from about 68 to about 77, a total C18:1 content of about 80% or greater and a minimum AOM value of about 300 hours in the absence of added antioxidants. If desired, the hydrogenated oil can be separated to obtain a liquid oil fraction that has an MDP of less than about 20° C., a trans-fatty acid content of about 40% or less, an IV of from about 75 to about 81, a total C18:1 fatty acid content of about 86% or greater and a minimum AOM value of about 350 hours in the absence of added antioxidants. Such an oil may have a total saturated fatty acid content of less than about 9.5%.

In some embodiments, such an oil is produced from a starting oil extracted from Brassicaceae seeds having a fatty acid profile comprising an oleic acid content of about 80% to about 87%, a linoleic acid content of about 2% to about 5% and an α-linolenic acid content of about 1% to about 4%. Such seeds can possess defects in both the first and second forms of delta-12 fatty acid desaturase found in Brassicaceae lines. The fatty acid profile may be controlled by heritable genetic change in a line designated 6Q4275A-1-4 and having ATCC accession number 97569.

A method of producing a canola oil is disclosed herein. In one embodiment, the method comprises the steps of providing a starting refined, bleached non-hydrogenated canola oil that has an oleic acid content of from about 72% to about 80%, a linoleic acid content of from about 5% to about 12% and an α-linolenic acid content of from about 1% to about 5%; and hydrogenating the starting oil to an IV of from about 68 to about 75. The hydrogenated oil has an MDP of more than about 30° C., a trans-fatty acid content of about 31% or less and a minimum AOM value of about 280 hours in the absence of added antioxidants. The method may further comprise the step of separating the hydrogenated oil into a solid fraction and a liquid canola oil fraction. The liquid fraction has an MDP of less than about 20° C., a trans-fatty acid content of less than about 31%, an IV of from about 72 to about 77 and a minimum AOM value of about 290 hours in the absence of added antioxidants. The starting oil may be extracted from Brassicaceae seeds designated IMC-130 and having ATCC accession number 75446.

Another method of producing a canola oil comprises the steps of providing a starting refined, bleached non-hydrogenated canola oil that has an oleic acid content of from about 80% to about 87%, a linoleic acid content of from about 2% to about 5% and an α-linolenic acid content of from about 1% to about 4%; and hydrogenating the starting oil to an IV of from about 68 to about 77. The hydrogenated oil has an MDP of more than about 30° C., a trans-fatty acid content of about 40% or less and a minimum AOM value of about 300 hours in the absence of added antioxidants. The method may further comprise the step of separating the hydrogenated oil into a solid fraction and a liquid canola oil fraction. The liquid fraction has an MDP of less than about 20° C., a trans-fatty acid content of about 40% or less, an IV of from about 75 to about 81, a total C18:1 fatty acid content of greater than about 85% or greater and a minimum AOM value of about 350 hours in the absence of added antioxidants. The starting oil may be extracted from Brassicaceae seeds having defects in both the first and second forms of delta-12 fatty acid desaturase. The starting oil may be extracted from Brassicaceae seeds designated 6Q4275A-1-4 and having ATCC accession number-97569.

DETAILED DESCRIPTION OF THE INVENTION

The present invention provides a hydrogenated canola oil that is low in saturated fatty acids and low in trans-fatty acids. The oil has superior oxidative stability, sensory characteristics and frying attributes when compared to known canola oils. In some embodiments, the modified oil is liquid at or below room temperature.

In the context of this disclosure, total saturated fatty acids include myristic (C14:0), palmitic (C16:0), stearic (C18:0), arachidic (C20:0), behenic (C22:0), and lignoceric (C24:0) acids. Trans-fatty acids include any trans isomer of a $C_{14}$ through $C_{24}$ fatty acid. Total C18:1 fatty acid refers to isomers of C18 monounsaturated fatty acids. Total C18:2 fatty acid refers to isomers of C18 diunsaturated fatty acids. Total C18:3 fatty acids refers to isomers of C18 triunsaturated fatty acids.

As used herein, "functionality" or "performance attributes" means properties or characteristics of the canola oil and includes flavor stability, fry stability, and oxidative stability.

"Oxidative stability" relates to how easily components of an oil oxidize, and can be measured, for example, by instrumental analyses such as Active Oxygen Method (AOM) American Oil Chemists' Society Official Method Cd 12-57 for Fat Stability:Active Oxygen Method (rev'd 1989); Rancimat (Laubli, M. W. and Bruttel, P. A., JOACS 63:792–795 (1986)) and Oil Stability Index (OSI) values, AOCS Method Cd 12b-92.

"Canola" refers to rapeseed (Brassica) that has an erucic acid ($C_{22:1}$) content of at most 2 percent by weight based on the total fatty acid content of a seed, preferably at most 0.5 percent by weight and most preferably essentially 0 percent by weight and that produces, after crushing, an air-dried meal containing less than 30 micromoles (μmol) of glucosinolates per gram of defatted (oil-free) meal.

A starting canola oil for use in the invention typically has been refined and bleached by methods known in the art. The starting refined, bleached (RB) canola oil may be further processed before hydrogenation, provided that such processing does not interfere with the subsequent hydrogenation process.

A starting canola oil preferably is derived from seeds having a low total glucosinolate content. Under standard processing conditions, an RB oil derived from seeds having a low total glucosinolate content generally has a lower sulfur content, compared to an RB oil derived from seeds having a high total glucosinolate content. Brassicaceae lines producing seeds having a low total glucosinolate content are described in U.S. application Ser. No. 08/290,660, now U.S. Pat. No. 5,750,827 incorporated herein by reference. The sulfur content of the starting oil is generally less than about 3.8 ppm, preferably less than about 3.0 ppm. In preferred embodiments, the oil has a sulfur content of less than about 1.5 ppm.

In one embodiment, an oil of the invention is hydrogenated such that the oil has a Mettler Drop Point (MDP) of from about 30° C. to about 45° C., preferably less than about 40° C., more preferably less than about 35° C. The iodine value (IV) is about 68 to about 75, preferably from about 70 to about 73.

Such an oil possesses a relatively low trans-fatty acid content of less than about 31% wt. In preferred embodiments the trans-fatty acid content is less than about 30%, preferably less than about 27%, more preferably less than about 25%. The stearic acid content of an oil of this embodiment typically is from about 10% to about 15%, preferably from about 10% to about 12%. The total saturated fatty acid content is from about 10% to about 20%, preferably from about 13% to about 18%. In addition, the total C18:1 fatty acid content of such an oil is greater than about 75%, preferably greater than about 80%.

Such an oil has a high oxidative stability. When oxidative stability is measured by the active oxygen method (AOM), the AOM value is from about 280 hours to about 350 hours, preferably from about 300 hours to about 350 hours. In preferred embodiments, the AOM value is from about 325 hours to about 350 hours.

In a second embodiment, a starting canola oil is hydrogenated and fractionated to obtain an oil that is liquid at or below room temperature. For example, such an oil has a MDP of less than about 20° C., preferably less than about 18° C.

An oil of the second embodiment possesses a low trans-fatty acid content of from about 20% to about 33%, preferably from about 23% to about 26%. An oil of this embodiment also possesses a low saturated fatty acid content. The stearic acid content typically is from about 7.5% to about 9.5%. The total saturated fatty acid content is from about 10% to about 14%, preferably from about 11% to about 12%. An oil of this embodiment possesses a total C18:1 fatty acid content of about 79% to about 87%, preferably from about 81% to about 83%. The IV is from about 72 to about 77, preferably from about 73 to about 76.

Such an oil has a high oxidative stability (measured in AOM hours) of about 290 hours to about 375 hours, preferably from about 330 hours to about 360 hours, more preferably from about 330 hours to about 350 hours.

An oil of these embodiments can be produced, for example, by hydrogenation of a starting canola oil extracted from Brassica seeds having a fatty acid profile comprising an oleic acid content of about 72% to about 80%, a linoleic acid content of about 5% to about 12% and an α-linolenic acid content of about 1% to less than about 5%.

Seeds having the indicated fatty acid profile are produced, for example, by canola lines IMC-130 (ATCC Accession No. 75446) and A13.30137, disclosed in U.S. patent application Ser. No. 08/425,108, filed Jun. 6, 1995, which is incorporated herein by reference.

Progeny of crosses between a first Brassica line (such as IMC-130) and an agronomically elite line are also suitable for producing such a starting canola oil, provided that the progeny possess the fatty acid profile of the first Brassica line and that the starting oil derived from the progeny can be hydrogenated as disclosed herein. Plant breeding techniques for producing such progeny are known in the art.

In a third embodiment, starting canola oil has been hydrogenated such that the oil has a MDP of about 30° C. to about 45° C., preferably less than about 40° C., preferably less than about 35° C. The IV is about 68 to 77, preferably from about 70 to 75.

Such an oil possesses an unusually high oxidative stability of from about 300 AOM hours to about 500 AOM hours, preferably from about 400 hours to about 500 hours, more preferably a minimum of about 425 hours.

Such an oil possesses a stearic acid content of about 5% to about 15%, a saturated fatty acid content of about 8% to about 20%, and a trans-fatty acid content of about 20% to about 45%, preferably from about 25% to about 40%, more preferably from about 27% to about 32%. The total C18:1 content is from about 78% to about 88%, preferably from about 80% to about 85%.

In a fourth embodiment, a starting canola oil has been hydrogenated and fractionated to obtain an oil that has a MDP of less than about 20° C., preferably less than about 18° C. The oil has an IV of about 75 to about 81, preferably from about 78 to about 80.

An oil of this embodiment possesses a low trans-fatty acid content of from about 20% to about 35%, preferably from about 25% to about 30%, more preferably about 30%. An oil of this embodiment also possesses a low saturated fatty acid content. For example, the stearic acid content of such an oil is from about 3% to about 6%, preferably from about 4% to about 5%. The total saturated fatty acid content is typically less than about 10%, preferably less than about 9.5%, more preferably about 9% or less.

An oil of this embodiment possesses a total C18:1 fatty acid content of greater than about 85%, preferably greater than about 86%, more preferably greater than about 87%, and up to about 92%.

An oil of this embodiment possesses a very high oxidative stability. When measured by the AOM method, such an oil possesses an AOM value of from about 350 hours to about 550 hours, preferably from about 400 hours to about 550 hours, more preferably a minimum of about 450 AOM hours.

An oil of the latter two embodiments may be produced by hydrogenation of a canola oil extracted from Brassica seeds. Such seeds have a fatty acid profile comprising an oleic acid content of from about 80% to about 87%, a linoleic acid content of from about 2% to about 5% and an alpha-linolenic acid content of from about 1% to about 4%. Brassica seeds having such a fatty acid profile may be produced, for example, by canola lines that contain defects in both fad2 genes of Brassica, i.e., delta-12 fatty acid desaturase genes. Lines having defects in both delta-12 fatty acid desaturase genes are described in U.S. patent application Ser. No. 08/572,027, filed Dec. 14, 1995, which is incorporated herein by reference.

An illustrative example of a Brassica line suitable for preparing a starting canola oil for the latter two embodiments is a line known as 6Q4275A-1-4 (ATCC Accession No. 97569), also referred to herein as 6Q4275. Progeny of crosses between a first Brassica line (such as 6Q4275) and an agronomically elite line are also suitable for producing such a starting canola oil, provided that the progeny possess the fatty acid profile of the first Brassica line and that the oil extracted from the progeny can be hydrogenated as disclosed herein. Means for making such crosses and producing progeny are known in the art.

Applicants have made a deposit of seeds of the Brassica lines indicated in Table 1 with the American Type Culture Collection (ATCC), 10801 University Boulevard, Manassas, Va. U.S.A. The seeds deposited with the ATCC are taken from the same deposit maintained by Cargill, Incorporated, Wayzata, Minn., since prior to the filing date of this application. These deposits will be maintained upon issuance of a patent without restriction in the ATCC depository, which is a public depository, for a period of 30 years, or 5 years after the most recent request, or for the effective life of the patent, whichever is longer, and will be replaced if the deposit becomes non-viable during that period.

TABLE 1

| Line | ATCC Deposit No. | Deposit Date |
| --- | --- | --- |
| IMC-130 | 75446 | April 16, 1993 |
| 6Q4275A-1-4 | 97569 | May 10, 1996 |

Other canola varieties suitable for preparing an oil of the invention may be obtained from progeny of the above-identified lines by known canola breeding methods including, but not limited to, outcrossing, backcrossing, recurrent selection, microspore culture and genetic transformation. Progeny are selected that retain the genetic loci conferring the fatty acid profile and oil quality characteristics of the parent due to heritable genetic change that is present in the parent.

Varieties such as IMC-01 and IMC-129 are not useful in practicing the invention because such varieties do not produce a seed oil useful in developing a partially hydrogenated oil having the superior oil quality characteristics of the partially hydrogenated oils disclosed herein.

A method according to the invention comprises hydrogenation of a refined, bleached (RB) rapeseed oil under mild reaction conditions. A nickel catalyst typically is used to promote hydrogenation. A suitable catalyst has a high linolenic selectivity and a low trans-isomerization selectivity in order to use lower reaction temperatures (e.g., 155° C.). Lower reaction temperatures permit hydrogenation of polyunsaturates in the oil while minimizing the formation of trans and saturated fatty acids. A suitable reaction temperature is from about 90° C. to about 170° C., preferably from about 130° C. to about 140° C. A high linoleic selectivity is also desirable in the catalyst.

An illustrative example of a suitable catalyst is N-545 nickel catalyst (Engelhard Corporation, Jackson, Miss.) which provides an average hydrogenation rate of from 2–5 psi/min. A suitable N-545 catalyst concentration is about 0.13 wt %. At this concentration, glucosinolates and other sulfur-containing compounds inherent in canola oil do not significantly interfere with the hydrogenation reaction. Hoffman, G., The Chemistry and Technology of Edible Oils and Fats and High Fat Products, Academic Press, London, pp. 206–217 (1989).

In some embodiments, the hydrogenated material is fractionated to obtain a liquid oil fraction having a low trans-fatty acid content and a low saturated fatty acid content. The unfractionated product is separated after hydrogenation into a solid fraction and a liquid canola oil fraction by techniques known in the art. Dry fractionation procedures may be used to separate the liquid and solid fractions of partially hydrogenated oils, e.g., a partially hydrogenated oil is crystallized at 21° C. for 15 hours, centrifuged, and the liquid is separated. Alternatively, the liquid from the crystallized mixture is separated by pressure or vacuum filtration. Pressure filtration typically uses an inert gas, e.g., $N_2$ at about 60 psi. In addition, a combination of the above procedures can be used to separate the liquid and solid fractions.

The hydrogenated and hydrogenated/fractionated liquid canola oils disclosed herein advantageously have a lower trans-fatty acid content compared to high oxidative stability soybean oils and cottonseed/soybean oil blends. Such liquid canola oils can have 30–40% less trans-fatty acids compared to the trans-fatty acid content of such soybean and soybean/cottonseed oils. Moreover, the MDP of such hydrogenated and fractionated canola oils can be more than 5° C. lower than commercially available high AOM soybean or soybean/cottonseed oils, (10° C. MDP versus 16° C. MDP).

The partially hydrogenated canola oils disclosed herein unexpectedly have high AOM values, despite the fact that the total C18:3 content is generally greater than 0.1% by weight, typically ranging from about 0.2% to about 0.8% by weight for oils having an IV of about 68 to about 80. At a given AOM value, a higher total C18:3 content, in combination with a low trans-fatty acid and total saturated fatty acid content, is preferred for nutritional reasons. The canola oils disclosed herein achieve such a desired combination of properties.

Hydrogenated and hydrogenated/fractionated canola oils disclosed herein may comprise substantially all of a final product. If desired, such oils can have various compounds added to form a final product, e.g., stabilizers, flavorings, emulsifiers, anti-spattering agents, colorants and/or antioxidants. Addition of antioxidants to hydrogenated or hydrogenated/fractionated canola oils disclosed herein significantly increases oxidative stability.

Hydrogenated and hydrogenated/fractionated canola oils may be used in food applications, e.g., frying oils, margarines or spreads, coating agents or confectionary fats. In addition, such oils may be used in industrial applications, e.g., energy transfer agents and friction-reducing agents. Energy transfer fluids include hydraulic fluids and lubricants. Friction-reducing fluids include cutting fluids, processing oils, motor oils and annealing agents. The hydrogenated and hydrogenated/fractionated oils disclosed herein provide an extended useful life and increased storage stability because of their high oxidative stability. Viscosity is more easily controlled with such oils compared to vegetable oils having lower oxidative stability. Moreover, the oils disclosed herein are biodegradable, thereby providing environmental benefits. If desired, the oils disclosed herein may be blended or mixed with other oils to meet the performance characteristics desired in the final product.

The invention will be further understood with reference to the following illustrative embodiments, which are purely exemplary and should not be taken as limiting the true scope of the present invention as described in the claims.

EXAMPLES

In the following Examples, all parts and percentages are by weight and all temperatures are degrees Celsius, unless otherwise stated. Oxidative stability is measured without deodorizing the hydrogenated product and without adding antioxidants, unless otherwise indicated.

Example 1

IMC-129 (a high oleic acid variety) and IMC-01 (a low α-linolenic acid variety) were the parent lines crossed to generate IMC-130. IMC-01 is described in U.S. patent application Ser. No. 08/290,660, incorporated herein by reference. IMC-129 is described in U.S. patent application Ser. No. 08/416,497, incorporated herein by reference.

IMC-130 seed was crushed and refined, bleached deodorized oil was prepared by a pilot plant process as described in Example 1 of U.S. patent application Ser. No. 08/425,108, incorporated herein by reference. Pilot plant processing of oils tends to reduce AOM hours, as pilot plant processing typically is much harsher on the oil than commercial processing.

The RBD IMC-130 oil, along with commercially available canola oils, was analyzed for fatty acid composition by gas chromatography. Table 2 provides data on the fatty acid profiles of IMC-130 oil compared to commercially available canola oils: IMC-129 (a high oleic acid oil), IMC-144 (an identity-preserved canola oil lacking the high oleic and low linolenic acid traits) and Brand A (a typical generic canola oil). The data demonstrate reduced levels of linoleic ($C_{18:2}$), α-linolenic ($C_{18:3}$), and total polyunsaturated fatty acids for IMC-130.

TABLE 2

Fatty Acid Composition of Refined, Bleached and Deodorized Oils

| | Fatty Acid Composition (%) | | | | | |
|---|---|---|---|---|---|---|
| Variety | $C_{16:0}$ | $C_{18:0}$ | $C_{18:1}$ | $C_{18:2}$ | $C_{18:3}$ | Total Polys* |
| IMC-130 | 3.6 | 2.9 | 76.2 | 10.3 | 3.4 | 13.7 |
| IMC-144 | 2.9 | 2.1 | 62.6 | 19.5 | 8.1 | 27.6 |
| IMC-129 | 3.9 | 2.0 | 78.8 | 7.7 | 3.9 | 11.6 |
| Brand A | 3.8 | 2.0 | 60.9 | 19.9 | 9.1 | 28.0 |

*Total polyunsaturated acids

IMC-130, IMC-144, IMC-01, and IMC-129 oils were evaluated for AOM hours under the methods outlined in the American Oil Chemists' Society (AOCS) Official Method Cd 12-57 for *Fat Stability:Active Oxygen Method* (rev'd. 1989). Each oil sample was prepared in duplicate.

As shown in Table 3, IMC-130 oil was found to have significantly higher AOM hours after similar pilot plant processing than other oils tested. The greater oxidative stability of IMC-130 oil compared to IMC-144 oil or IMC-01 oil can be attributed to a lower polyunsaturated fatty acid content. However, the greater oxidative stability of IMC-130 oil compared to IMC-129 oil cannot be attributed solely to fatty acid composition because IMC-130 oil and IMC-129 oil have similar fatty acid compositions. In fact, IMC-130 oil can have slightly higher levels of polyunsaturates (Table 2). These results indicate that oxidative stability is not solely related to fatty acid composition.

TABLE 3

AOM Hours of Pilot Plant Processed Canola Oils

| IMC-144 | IMC-01 (Low ALA)* | IMC-129 (High Oleic) | IMC-130 (Example 1) |
|---|---|---|---|
| 15–22 | 20–22 | 16 | 37–40 |

*ALA = α-linolenic acid

Example 2

IMC-129 and IMC-130 seed were crushed and processed by commercial processing methods to form refined, bleached, deodorized canola oil as described in Example 5 of U.S. application Ser. No. 08/425,108, filed Jun. 6, 1995, incorporated herein by reference.

Oxidative stability of each oil was determined by measuring the increase in Peroxide Value and in para-Anisidine Value generated under accelerated aging conditions using a modified Schaal oven test. The test oil (200 g) was placed in an 500 ml uncovered amber glass bottle with a 4.3 cm opening, and placed in a 60° C. convection oven. One bottle was prepared for each evaluation. Results are found in Table 4 and Table 5.

The peroxide value was measured using the AOCS Official Method Cd 8b-90. Hydroperoxides generated from oxidation of the triacylglycerols were measured by the peroxide value. The peroxide value was expressed in terms of milliequivalents of peroxide per 1000 grams of sample (meq/Kg). Reduced development of hydroperoxides during storage was an indicator of improved oxidative stability.

The para-anisidine value was measured using the AOCS Official Method Cd 18-90. Aldehydes generated from the oxidation of the triacylglycerol was measured by the p-anisidine value. The p-anisidine value was 100 times the optical density measured at 350 nm in a 1 cm cell of a solution containing 1.00 g of the oil in 100 ml of a mixture of solvent and reagent according to the method referenced, and is absorbance/g. Reduced development of aldehydes during storage was an indicator of improved oxidative stability of the oil.

TABLE 4

Accelerated Aging - Oxidative Stability
Increase in Peroxide Value, Milliequivalents per kg

| Days in oven: | IMC-130 | IMC-129 |
|---|---|---|
| 3 | 0.9 | 0.7 |
| 6 | 2.1 | 2.3 |
| 9 | 12.6 | 14.9 |
| 12 | 16.1 | 22.1 |
| 15 | 24.5 | 29.7 |

TABLE 5

Accelerated Aging - Oxidative Stability
Increase in para-Anisidine Value, Absorbance per g

| Days in oven: | IMC-130 | IMC-129 |
|---|---|---|
| 6 | 0.1 | 0.2 |
| 9 | 2.0 | 3.1 |
| 12 | 4.8 | 6.9 |
| 15 | 6.9 | 10.2 |

The IMC-130 deodorized oil was analyzed for fatty acid composition via gas chromatography. The percent fatty acids were $C_{16:0}$ of 3.6%, $C_{18:0}$ of 2.2%, $C_{18:1}$ of 74.3%, $C_{18:2}$ of 11.9%, $C_{18:3}$ of 4.8% and total polyunsaturated of 16.7%. These data can be compared to the values for IMC-144, IMC-129 and Brand A oils as shown in Table 2. The data demonstrate that IMC-130 maintains reduced levels of linolenic acid ($C_{18:2}$), α-linolenic ($C_{18:3}$), and total polyunsaturated fatty acids when compared to canola oils IMC-144 and Brand A.

Table 6 provides data on the AOM hours of the IMC-130 oil processed as described above (commercial processing), compared to IMC-129, IMC-144, and IMC-01. The IMC-130 oil was evaluated for AOM hours under the methods outlined in the American Oil Chemists' (AOCS) Official Method Cd 12-57 for Fat Stability: Active Oxygen Method (rev'd 1989). The higher AOM hours of IMC-130 reflects its greater oil stability. Each oil sample was prepared in duplicate.

TABLE 6

AOM Hours of Commercially Processed Canola Oils

| IMC-144 | IMC-01 (Low ALA)* | IMC-129 (High Oleic) | IMC-130 (Example 2) |
|---|---|---|---|
| 15–18 | 30 | 30 | 37.5 |

*ALA = α-linolenic acid

Example 3

Canola oil was extracted from seeds of IMC-01, IMC-130 and 6Q4275, using pilot plant procedures or commercial plant procedures.

| Oil | Process |
|---|---|
| RBD IMC-01 | Commercial |
| RB IMC-01 | Commercial |
| RB IMC-130 | Commercial |
| RBD 6Q4275 | Pilot |

Typical characteristics of starting IMC-01 oils, IMC-130 oil, and 6Q4275 oil are shown in Table 7.

TABLE 7

Oil Characteristics

IMC-01:
Refined, Bleached & Refined, Bleached, Deodorized Oils

| Color, Lovibond, 5.25" | 1.0 red max |
|---|---|
| Peroxide Value, (meq/kg) | 1.0 max |
| Iodine Value | 105. ± 5.0 |
| Flavor and Odor | ≧8 |
| AOM Stability, (hours) | 25 ± 2 |

IMC-130:
Refined, Bleached Oil

| Color, Lovibond, 5.25" | 1.0 red max |
|---|---|
| Peroxide Value, (meq/kg) | 1.0 max |
| Iodine Value | 95.0 ± 5.0 |
| Flavor and Odor | ≧8 |
| AOM Stability, (hours) | 35 ± 2 |

6Q4275:
Refined, Bleached, Deodorized Oil

| Color, Lovibond, 5.25" | 0.3 red |
|---|---|
| Peroxide Value, (meq/kg) | 1.14 |
| Iodine Value | 90.3 ± 1.0 |
| Flavor and Odor | 7.1 |
| AOM Stability, (hours) | 55 ± 2 |

400 g of canola oil and the indicated amount of catalyst were added to a Parr model 4563 reactor (Moline, Ill.). After assembly of the reactor, the water lines and the hydrogen line, the controller (Parr model 4548) was set to the desired temperature, the agitation speed was set to 600 rpm, and the reactor was placed under house vacuum (~13 cm Hg). Once the set temperature of about 155° C. was reached, the vacuum was shut off, the reactor was pressurized with hydrogen to 30 or 45 psi pressure and released to flush the reactor. The $H_2$ purge was repeated three times and the final pressure for hydrogenation was set as indicated in the Tables. Hydrogenation consumption was calculated by closing the hydrogen valve to the reactor and recording the pressure drop of hydrogen from either 30 or 45 psi for a 5 minute interval. Hydrogenation reaction conditions for each reaction are shown in Table 8.

At the end of the hydrogenation reaction, the product was stirred for 10 minutes with 0.5 wt % Celite (bleaching earth) and filtered through a Buchner funnel using a Whatman #5 and GF/F filter paper and 2–3 mm of silica gel (enough to cover the filter paper). This method was shown to reduce the amount of nickel catalyst in the filtrate down to 0.2 ppm. If desired, a citric acid treatment can be used to further reduce the nickel down to <0.11 ppm. An aliquot of the filtrate was then analyzed for IV, fatty acid composition, and oxidative stability as described below.

The hydrogenated material was melted on a steam bath and homogenized. Samples were then placed in centrifuge tubes, balanced, sealed, and left in a water bath at 13° C. for 15 hours. The following day, the tubes were taken out and centrifuged at 10,000 RPM (10,000×G) for 20 minutes in a Beckman J-21C centrifuge. The supernatant was decanted and labeled the liquid fraction. The pellet was melted by steam bath, poured into an appropriate container, and labeled the solid fraction. Each fraction was analyzed as described below.

Trans-fatty acid levels and IV values of the final hydrogenated products, liquid fractions and solid fractions were determined by gas liquid chromatography (GLC). The GLC method is described in AOCS Official Method Ce 1c-89 (1991). Schaal Oven Stability was calculated from peroxide values. The fatty acid composition, iodine values, and tocopherol content also were determined.

Each sample was tested at 110° C. for oxidative stability using an Oxidative Stability Index instrument, Omnion, Inc., Rockland, Mass. AOM hours were calculated using the OSI software according to the manufacturers instructions.

The Oxidative Stability Index instrument was used to determine the oxidative stability of oils and fats according to AOCS Official Method Cd 12b-92 (revised 1993). The method is an automated replacement for the Active Oxygen Method (AOM) procedure, AOCS Official Method Cd 12-57.

The N-545 catalyst (26% Ni, 5% inert support) at a concentration of 0.13 wt % worked satisfactorily. A reaction temperature of 155° C. kept the average hydrogenation rate >2 psi/min with an increase in trans-fatty acid formation ranging between 21% to 35% (Tables 8 and 9). The reaction temperature and the trans content can be lowered further by choosing a catalyst having higher activity and higher linolenic acid and linoleic acid selectivity. A hydrogenation pressure of 45 psi gave the best consumption rate of hydrogen in the reaction.

The fatty acid composition, iodine values and oxidative stability of hydrogenated and hydrogenated/fractionated oils are shown in Table 9. For RB IMC-130 oil, the AOM value was 351 hours for the liquid fraction of reaction 2689-28-L. RBD 6Q4275 canola oil had an AOM value of 307 hours in the liquid fraction of reaction 2695-11-L. The results shown in Table 9 demonstrate that a high oxidative stability canola oil that is liquid at or below room temperature can be produced from a starting IMC-130 oil or a starting 6Q4275 oil.

TABLE 8

Hydrogenation Reaction Conditions

| Type of Oil | Sample No. | Catalyst (wt %) | Temperature (°C.) | Hydrogenation Pressure (psi)[a] | Reaction Time (min) | Rate of Hydrogenation (psi/min) | Final IV[b] |
|---|---|---|---|---|---|---|---|
| RBD IMC-01 | 2671-94 | N-545 (0.2%) | 155 | 30 | 140 | 1.48 | 78.59 |
| RB IMC-01 | 2689-07 | N-545 (0.5%) | 155 | 30 | 120 | 1.64 | 90.14 |
|  | 2689-16 | N-545 (0.06%) | 155 | 45 | 90 | 4.77 | 78.83 |
|  | 2689-18 | N-545 (0.13%) | 155 | 45 | 110 | 7.31 | 68.09 |
| RB IMC-130 | 2689-28 | N-545 (0.13%) | 155 | 45 | 90 | 3.43 | 70.16 |
| RBD 6Q4275 | 2695-08 | N-545 (0.13%) | 150, 155 | 45 | 149 | 1.86 | 66.58 |
|  | 2695-11 | N-545 (0.13%) | 130, 155 | 45 | 150 | 1.43 | 79 |

[a]:Pounds per square inch in the Parr Reactor.
[b]:Iodine Values determined by AOCS Tg 1a-64 methodology.

TABLE 9

Fatty Acid Composition[b], Iodine Values, & AOM hours of Canola Oils after Hydrogenation and Fractionation.

| Type of Oil | Sample No.[a] | C16:0 | C18:0 | Total C18:1 | Total C18:2 | Total C18:3 | Total trans | % Sats | IV[c] | AOM (hrs)[d] |
|---|---|---|---|---|---|---|---|---|---|---|
| RBD IMC-01 | Control | 3.97 | 2.46 | 66.32 | 21.83 | 2.14 | 0.29 | 10.77 | 101.5 | 24.40 |
|  | 2671-94 | 3.96 | 8.31 | 80.14 | 4.47 | 0.55 | 25.94 | — | 78.86 | 108.28 |
| RB IMC-01 | 2689-07 | 4.03 | 4.58 | 73.08 | 14.13 | 0.73 | 8.55 | — | 90.14 | 22.40 |
|  | 2689-16-F | 4.04 | 10.43 | 75.45 | 7.05 | 0.35 | 22.51 | 15.82 | 78.83 | 42.30 |
|  | 2689-16-L | 3.70 | 7.22 | 77.49 | 7.35 | 0.34 | 21.51 | 12.12 | 81.08 | 69.90 |
|  | 2695-16-S | 4.15 | 12.05 | 73.93 | 6.80 | 0.40 | 23.45 | 17.66 | 76.55 | 30.53 |
|  | 2689-18 | 4.04 | 15.73 | 76.00 | 0.70 | 0.38 | 34.21 | — | 68.09 | 187.00 |
| RB IMC-130 | Control | 3.78 | 2.75 | 74.09 | 11.50 | 4.34 | 0.36 | 7.91 | 96.22 | 33.10 |
|  | 2689-28-F | 3.83 | 13.53 | 77.36 | 1.14 | 0.37 | 31.92 | 19.04 | 70.16 | 327.20 |
|  | 2689-28-L | 3.17 | 8.70 | 83.61 | 1.16 | 0.46 | 30.94 | 13.28 | 75.86 | 351.00 |
|  | 2689-28-S | 4.09 | 15.36 | 75.02 | 0.95 | 0.41 | 32.19 | 21.24 | 67.88 | 287.59 |

TABLE 9-continued

Fatty Acid Composition[b], Iodine Values, & AOM hours of Canola Oils after Hydrogenation and Fractionation.

| Type of Oil | Sample No.[a] | C16:0 | C18:0 | Total C18:1 | Total C18:2 | Total C18:3 | Total trans | % Sats | IV[c] | AOM (hrs)[d] |
|---|---|---|---|---|---|---|---|---|---|---|
| RBD 6Q4275 | Control | 3.44 | 1.92 | 84.08 | 3.39 | 4.02 | 0.64 | 6.49 | 90.29 | 56.91 |
| | 2695-08-F | 3.59 | 16.79 | 76.07 | 0.59 | 0.77 | 49.99 | — | 66.58 | 423.50 |
| | 2695-11-F | 3.45 | 5.60 | 87.00 | 1.22 | 0.30 | 27.25 | 10.23 | 79.79 | 318.11 |
| | 2695-11-L | 3.03 | 3.24 | 89.45 | 1.22 | 0.30 | 25.25 | 7.26 | 80.11 | 307.31 |
| | 2695-11-S | 4.09 | 8.79 | 82.76 | 1.12 | 0.46 | 29.64 | 14.32 | 74.00 | 224.45 |

[a]:F refers to the hydrogenated product; S refers to the solid fraction; L refers to the liquid after dry fractionation/centrifugation at 13° C.
[b]:The fatty acid composition determined by AOCS method Ce 1c-89 methodology.
[c]:IV, determined by AOCS method Ce 1c-89.
[d]:AOM hours as calculated from Oil Stability Index values.

Example 4

The RBD 6Q4275 canola oil used in this Example was seven months old and had a PV of 1.67 meq/kg. Water washing and Celite treatment were carried out on the RBD 6Q4275 oil to remove citric acid. The 6Q4275 oil was extracted 3 times with 20% (v/v) water to oil. After extraction, the oil was mixed for 10 minutes with 0.5% Celite and filtered through glass membrane filter paper that was layered with a thin coat of silica gel. The Celite addition and filtration procedure was repeated two more times to remove any polar contaminants.

450 g of RB IMC-130 or RBD 6Q4275 canola oil was placed in the Parr reactor. The agitation speed of the stirring motor was set to 600 rpm, and the temperature was increased to 155° C. The reactor was placed under vacuum (2 mm of Hg) for 30 minutes with a pump and dry ice/isopropyl alcohol trap. This process removed any moisture and volatiles trapped in the oil. After 30 minutes, the oil was cooled to 35° C., the negative pressure from the vacuum was equilibrated to atmospheric pressure, the reactor top removed and 0.13 wt % of N-545 catalyst was added to the oil. The reactor was reassembled and pressurized/purged three times with hydrogen to 35 psi. The reaction was heated to 155° C. and the hydrogen pressure was equilibrated at 45 psi. Hydrogen usage rate was calculated by closing the hydrogen valve to the reactor and recording the pressure drop of hydrogen from 45 psi for a 5 minute interval. After completing the hydrogenation, the samples were treated with Celite and filtered through silica gel as described in Example 3. The reaction times, hydrogenation pressures and other reaction conditions are shown in Table 10.

IV and trans-fatty acid contents of hydrogenated and hydrogenated/fractionated products were determined by GLC as described in Example 3. Oxidative stability and fatty acid composition were determined as described in Example 3. The winterizing/centrifugation fractionation procedure was the same as in Example 3, except that the bath temperature was set at 21° C. and centrifugation was carried out for 25 minutes.

Table 11 summarizes the results for hydrogenated and hydrogenated/fractionated IMC-130 canola oil. The IV ranged from about 66–76; the trans-fatty acid content was between 26% to 29%. The saturated fatty acid content for the liquid fraction was less than 14%.

The results for hydrogenated and hydrogenated/fractionated 6Q4275 oil samples are shown in Table 12.

6Q4275 samples had very high oxidative stability values, despite the fact that the starting oil was prepared by pilot plant processing, required removal of citric acid before hydrogenation and had a high initial PV. For example, the liquid fraction from sample 62 had 392 AOM hours, an IV of about 79 and a trans-fatty acid content of about 33%. An RB starting oil prepared by commercial processing and having a lower initial PV results in a hydrogenated/fractionated oil having an oxidative stability of up to 600 AOM hours.

Hydrogenated 6Q4275 and IMC-130 oils had high oxidative stability values even though the total C18:3 fatty acid content was greater than 0.2%. In contrast, known partially hydrogenated canola oils typically have less than 0.2% total C18:3 at correspondingly high oxidative stability values.

Characteristics of the liquid fraction of 2 hydrogenated IMC-130 oil samples are shown in Table 13. Both oil samples had a lower trans-fatty acid content compared to commercially available soybean and soybean/cottonseed oils of similar oxidative stability. The 65A-L oil (Table 13) had a superior flavor score, lower color score, lower SFI and lower MDP compared to commercially available soybean and cottonseed/soybean oils of similar oxidative stability. 6Q4275 oils also have superior properties compared to commercially available cottonseed/soybean oils of similar oxidative stability.

TABLE 10

HYDROGENATION REACTION CONDITIONS

| Type of Oil | Reaction No. | Reaction Time (min) | Rate of Hydrogenation (psi/min) | Total Hydrogenation Consumption (psi) | Final IV |
|---|---|---|---|---|---|
| RB IMC-130 | 59A | 118 | 4.44 | 524.3 | 70.14 |
| | 62A | 125 | 3.98 | 497.5 | 70.01 |
| RBD 6Q4275 | 51 | 80 | 5.56 | 444.8 | 72.26 |
| | 56 | 88 | 4.48 | 394.5 | 71.04 |
| | 62 | 77 | 4.97 | 382.5 | 73.81 |

TABLE 11

Fatty Acid Composition, Iodine Values, & AOM hours of Hydrogenated IMC-130 Canola Oil

| Sample | C16:0 | C18:0 | Total C18:1 | Total C18:2 | Total C18:3 | Total trans | % sats. | IV | AOM (hrs) | MDP (C) |
|---|---|---|---|---|---|---|---|---|---|---|
| Control | 3.53 | 2.48 | 74.73 | 11.17 | 4.61 | 0.15 | 7.48 | 97.29 | 28.20 | — |
| 59A-F | 3.59 | 14.03 | 76.32 | 1.70 | 0.33 | 27.52 | 19.28 | 70.14 | 267.11 | 34.6 |
| 59-A-S | 3.86 | 16.93 | 73.50 | 1.57 | 0.29 | 27.83 | 22.54 | 67.33 | 122.21 | — |
| 59A-L | 3.15 | 9.03 | 82.11 | 1.77 | 0.32 | 26.53 | 13.56 | 75.28 | 336.89 | 17.7 |
| 62A-F | 3.59 | 13.97 | 76.57 | 1.43 | 0.39 | 28.70 | 19.23 | 70.01 | 287.44 | 39.0 |
| 62A-S | 3.84 | 16.87 | 73.25 | 1.25 | 0.35 | 29.09 | 22.49 | 66.67 | 156.39 | — |
| 62A-L | 3.09 | 8.27 | 83.29 | 1.74 | 0.36 | 27.41 | 12.73 | 76.35 | 345.97 | 15.3 |

TABLE 12

Fatty Acid Composition, Iodine Values, & AOM hours of Hydrogenated 6Q4275 Canola Oil

| Sample | C16:0 | C18:0 | Total C18:1 | Total C18:2 | Total C18:3 | Total trans | % sats. | IV | AOM (hrs) | MDP (C) |
|---|---|---|---|---|---|---|---|---|---|---|
| Control | 3.41 | 1.69 | 83.97 | 3.47 | 4.08 | 0.44 | 6.23 | 90.86 | 55.58 | — |
| 51-F | 3.49 | 12.76 | 79.87 | 0.98 | 0.53 | 40.69 | 17.53 | 72.26 | 418.17 | — |
| 51-S | 3.66 | 15.03 | 76.58 | 0.83 | 0.53 | 40.75 | 20.05 | 69.12 | 385.47 | — |
| 51-L | 2.90 | 5.47 | 87.11 | 0.94 | 0.54 | 37.67 | 9.37 | 78.56 | 385.10 | — |
| 56-F | 3.55 | 14.29 | 78.97 | 0.71 | 0.59 | 45.96 | 19.09 | 71.04 | 410.03 | 44.2 |
| 56-S | 3.58 | 14.84 | 76.89 | 0.71 | 0.60 | 45.87 | 19.71 | 69.27 | 364.87 | — |
| 56-L | 2.67 | 5.05 | 88.55 | 0.77 | 0.61 | 43.06 | 8.63 | 79.61 | 401.21 | 17.6 |
| 62-F | 3.45 | 10.09 | 81.84 | 0.98 | 0.44 | 35.54 | 14.77 | 73.81 | 405.79 | 32.9 |
| 62-S | 3.77 | 13.79 | 77.60 | 0.97 | 0.40 | 37.36 | 18.95 | 69.98 | 386.41 | — |
| 62-L | 2.96 | 4.73 | 87.39 | 0.99 | 0.43 | 33.24 | 8.68 | 78.68 | 392.01 | 17.0 |

Example 5

The effect of antioxidants on oxidative stability was also tested. The non-hydrogenated oils of Example 3 were mixed with the antioxidants indicated in Table 14. Samples were then tested for oxidative stability as described in Example 3. Flavor scores were determined by AOCS method Cg 2-83. A score of greater than 7 indicates a slight to bland flavor, and is a preferred oil quality.

As shown in Table 14, the oxidative stability of non-hydrogenated IMC-130 oil increased up to 2-fold when antioxidants were added, yet maintained preferred flavor scores. Non-hydrogenated 6Q4275 oil increased 3-fold in oxidative stability and had an improved flavor score when antioxidant TBHQ was added. Hydrogenated and hydrogenated/fractionated IMC-130 and 6Q4275 oils also show significant increases in oxidative stability when antioxidants are added, while maintaining superior flavor scores.

TABLE 13

Characteristics of High Oxidative Stability

| | Type of Oil | | IMC-130 Sample No. | |
|---|---|---|---|---|
| Characteristics | 65A-L | 84-2 | Durkex 500 ® | Durkex 500S ® |
| C16:0 | 3.24 | 3.00 | 6.46 | 9.67 |
| C18:0 | 9.20 | 8.50 | 4.39 | 3.92 |
| Total C18:1 | 81.66 | 83.24 | 82.98 | 79.72 |
| Total C18:2 | 2.23 | 1.18 | 2.88 | 3.00 |
| Total C18:3 | 0.29 | 0.55 | 0.11 | 0.07 |
| % trans | 26.68 | 31.72 | 47.55 | 39.56 |
| IV | 75.61 | 75.63 | 76.76 | 74.26 |
| Hydroxyl Value | 7.5 | — | 12.1 | — |
| Color (Gardner) | 1–2 | 1–2 | 3 | 5 |
| Color (Lovibond-red) | 0.5 | 0.5 | 1.7 | 4.8 |
| Flavor Score[a] | 8 | — | 5.9 | 6.2 |
| Solid Fat Index 10° | 4.3 | — | 17.9 | 12.5 |
| Solid Fat Index 21° C. | 0.4 | — | 0.1 | 0.3 |
| Mettler Drop Pt. (°C.) | 10 | — | 16.06 | 16 |
| Tocopherols (ppm) | 680 | 780 | 620 | 230 |
| ACM (hours)[b] | 347.4 | 436.59 | 438.26 | 327.36 |

[a]Determined according to AOCS method Cg2-83.
[b]Calculated from OSI value.
[c]Hydrogenated soybean oil, Van den Bergh Foods, Lisle, IL
[d]Hydrogenated soybean/cottonseed oil, Van den Bergh Foods

TABLE 14

Oxidative Stability and Flavor Scores of Non-Hydrogenated Oils Having Added Antioxidants

| Type of Oil | Sample No. | Herbalox O (ppm) | Ascorbalox A (ppm) | Duralox (ppm) | TBHQ (hours) | AOM (hours) | Flavor Score |
|---|---|---|---|---|---|---|---|
| IHC-130 | Control | — | — | — | — | 47.37 | 8.5 |
| | 130-02 | 510 | — | — | — | 52.55 | 7.9 |
| | 130-03 | 502 | 222 | — | — | 61.03 | 7.5 |
| | 130-04 | 512 | 550 | — | — | 59.72 | 7.8 |
| | 130-05 | — | 540 | — | — | 55.97 | 7.1 |
| | 130-12 | — | 1,000 | — | — | 63.58 | — |
| | 130-16 | — | — | 505 | — | 66.99 | 8.6 |
| | 130-17 | — | — | 1,015 | — | 83.35 | 7.8 |
| | 130-18 | — | — | 1,515 | — | 105.39 | 7.7 |
| 6Q4275 | Control | — | — | — | — | 43.00 | 7.1 |
| | 6Q-O1 | — | — | — | 175 | 137.00 | 8.6 |

To the extent not already indicated, it will be understood by those of ordinary skill in the art that any one of the various specific embodiments herein described and illustrated may be further modified to incorporate features shown in other of the specific embodiments.

The foregoing detailed description has been provided for a better understanding of the invention only and no unnecessary limitation should be understood therefrom as some modifications will be apparent to those skilled in the art without deviating from the spirit and scope of the appended claims.

What is claimed is:

1. A hydrogenated and fractionated canola oil, said oil having a total saturated fatty acid content of about 9% or less, an IV of from about 75 to about 81, a total C18:1 fatty acid content of about 86% or greater and a minimum Active Oxygen Method value of about 400 hours in the absence of added antioxidants.

2. The oil of claim 1, wherein said AOM minimum value is about 450 hours.

3. The oil of claim 1, wherein said total C18:1 content from about 87% to about 92%.

4. The oil of claim 1, wherein said Active Oxygen Method value is from about 400 hours to about 600 hours.

5. The of claim 1, wherein said AOM value is from about 450 hours to about 550 hours.

6. The oil of claim 1, wherein said total saturated fatty acid content is from about 8.6% to about 9%.

7. The oil of claim 1, wherein said IV is from about 78 to about 80.

8. A method of producing a canola oil, comprising the steps of:
 (a) providing a starting refined, bleached non-hydrogenated canola oil, said oil having an oleic acid content of from about 80% to about 87%, a linoleic acid content of from about 2% to about 5% and an α-linolenic acid content of from about 1% to about 4%;
 (b) hydrogenating said starting oil to an IV of from about 68 to about 77; and
 (c) separating said hydrogenated oil into a solid fraction and a liquid canola oil fraction, said liquid fraction having a total saturated fatty acid content of about 9% or less, an IV of from about 75 to about 81, a total C18:1 fatty acid content of about 86% or greater and a minimum Active oxygen Method value of about 400 hours in the absence of added antioxidants.

9. The method of claim 8, wherein said AOM minimum value is about 450 hours.

10. The method of claim 8, wherein said starting oil is extracted from Brassicaceae seeds having defects in first and second forms of delta-12 fatty acid desaturase.

11. The method of claim 10, wherein said starting oil is extracted from Brassicaceae seeds designated 6Q4275A-1-4 and having ATCC accession number 97569.

* * * * *